United States Patent
Kim et al.

(10) Patent No.: US 6,943,723 B2
(45) Date of Patent: Sep. 13, 2005

(54) COMBINED RADAR AND LASER DETECTOR HAVING GPS RECEIVER AND USING WIRELESS COMMUNICATION

(75) Inventors: Dong-Ryeol Kim, Gwangmyung-Si (KR); Sun-Woung Jung, Kyungki-Do (KR)

(73) Assignee: Channel Technology, Inc., Anyang (KR)

( * ) Notice: Subject to any disclaimer, the term of this patent is extended or adjusted under 35 U.S.C. 154(b) by 0 days.

(21) Appl. No.: 10/829,184

(22) Filed: Apr. 22, 2004

(65) Prior Publication Data

US 2004/0239553 A1 Dec. 2, 2004

(30) Foreign Application Priority Data

Jun. 2, 2003 (KR) ................................. 10-2003-0035262

(51) Int. Cl.[7] ............................. G01S 7/40; G01S 13/00
(52) U.S. Cl. .............................. 342/20; 342/13; 342/52; 342/54; 342/58; 342/60; 342/175; 342/176; 342/195
(58) Field of Search .......................... 342/13–20, 52–60, 342/70–72, 175, 176, 195, 357.01–357.17; 701/200, 207, 213

(56) References Cited

U.S. PATENT DOCUMENTS

| | | | | |
|---|---|---|---|---|
| 6,118,403 A | * | 9/2000 | Lang ..................... | 342/357.09 |
| 6,201,493 B1 | * | 3/2001 | Silverman ................. | 342/20 |
| 6,204,798 B1 | * | 3/2001 | Fleming, III ............... | 342/20 |
| 6,384,776 B1 | * | 5/2002 | Martin ................... | 342/357.09 |
| 6,400,304 B1 | * | 6/2002 | Chubbs, III ............... | 342/20 |
| 6,480,144 B1 | * | 11/2002 | Miller et al. ............... | 342/72 |
| 6,483,452 B1 | * | 11/2002 | Iwakini .................. | 342/20 |
| 6,567,035 B1 | * | 5/2003 | Elliott .................... | 342/20 |
| 6,614,385 B2 | * | 9/2003 | Kuhn et al. ............... | 342/20 |
| 6,670,905 B1 | * | 12/2003 | Orr ...................... | 342/20 |
| 6,693,580 B1 | * | 2/2004 | Wehling ................. | 342/20 |
| 6,750,785 B2 | * | 6/2004 | Trajkovic et al. ........... | 342/20 |

* cited by examiner

*Primary Examiner*—Bernarr E. Gregory
(74) *Attorney, Agent, or Firm*—Arent Fox PLLC

(57) ABSTRACT

The present invention relates generally to a combined radar and laser detector that enables a driver to drive safely and, more particularly, to a combined radar and laser detector, in which a signal receiving module for receiving various kinds of signals including traffic information and an information display module for informing a driver of the signals are separated, the signal receiving module and information display module are constructed to communicate with each other using wireless communication, and the information display module is integrated with a Global Positioning System (GPS) receiver detecting GPS data related to the location and speed of a moving vehicle, so that the combined radar and laser detector can not only provide accurate traffic information to the driver, but also allow the installation thereof to be easy, the miniaturization thereof to be achieved, and power consumption to be minimized.

5 Claims, 3 Drawing Sheets

COMBINED RADAR AND LASER DETECTOR HAVING GPS RECEIVER AND USING WIRELESS COMMUNICATION

BACKGROUND OF THE INVENTION

1. Field of the Invention

The present invention relates generally to a combined radar and laser detector that enables a driver to drive safely and, more particularly, to a combined radar and laser detector, which has a global positioning system receiver capable of detecting global positioning system data related to the location and speed of a moving vehicle and uses wireless communication, so that the combined radar and laser detector can not only provide accurate traffic information to a driver, but also allow the installation thereof to be easy, the miniaturization thereof to be achieved, and the power consumption thereof to be minimized.

2. Description of the Related Art

Various traffic safety devices for the safe driving of vehicles have been developed and used. In particular, the use of a combined radar and laser detector is generalized in U.S. and Europe to enable a driver to drive safely using traffic information, such as low speed zones, school zones and road maintenance/construction zones, provided to the driver through microwaves and a laser.

FIG. 1 is a diagram schematically showing the construction of a conventional combined radar and laser detector, and the conventional combined radar and laser detector includes a horn antenna 10, a signal processing unit 20 for detecting a signal received through the horn antenna 10, a laser module 30 for receiving a laser signal, a central processor unit 40 for controlling the detection of the signals received through the signal processing unit 20 and the laser module 30, a visual display means 50 for visually displaying the detected signals, and an audible indication means 60 for audibly outputting the detected signals through an audio amplification unit 61.

The conventional combined radar and laser detector 1 constructed as described above is generally mounted on a dashboard using a fastening means, as shown in FIG. 2. However, in the case of mounting the combined radar and laser detector 1 in a vehicle, a problem arises in that various kinds of signals enabling the driver to drive safely cannot be easily received.

That is, a combined radar and laser detector generally uses a high frequency of 10 to 40 GHz, but the high frequency has directionality, so that the horn antenna needs to be located on the front of the vehicle.

However, in the case of mounting the horn antenna on the front of the vehicle, work is required to connect the horn antenna, placed outside the vehicle, with a visual display means and an audible indication means, placed inside the vehicle and adapted to provide traffic information to the driver through a wire, so that a problem arise in that it is difficult to install the combined radar and laser detector.

Additionally, the conventional combined radar and laser detector is constructed in such a way that the horn antenna and other components are integrated into a single body, so that the size of the combined radar and laser detector is large, and thus problems arise in that it is difficult to ensure a space for installation and excessive power consumption is incurred.

Furthermore, the conventional combined radar and laser detector is disadvantageous in that it cannot provide various kinds of information to the driver. To solve the above problems, there have been attempts to combine a Global Positioning System (GPS) receiver, which detects GPS data related to the location and speed of a moving vehicle, with the combined radar and laser detector to provide accurate and various kinds of traffic information to a driver. However, a problem still arises in that faulty operations occur due to frequency interference when the combined radar and laser detector is constructed to include the GPS receiver, so that it is difficult to guarantee the reliability of the operation of the combined radar and laser detector.

SUMMARY OF THE INVENTION

Accordingly, the present invention has been made keeping in mind the above problems occurring in the prior art, and an object of the present invention is to provide a combined radar and laser detector, in which a signal receiving module for receiving various kinds of signals enabling a driver to drive safely and an information display module for informing the driver of the signals are separated, the signal receiving and information display modules are constructed to communicate with each other using wireless communication, and the information display module is integrated with a GPS receiver detecting GPS data related to the location and speed of a moving vehicle.

In order to accomplish the above object, the present invention provides a combined radar and laser detector having a GPS receiver and using wireless communication, including a signal receiving module, which includes a signal processing unit for detecting a signal received through a horn antenna, a laser receiving unit for receiving a laser signal, a central processor unit for controlling detection of the signals received through the signal processing unit and the laser receiving unit, analyzing the detected signals, and outputting the information data of the detected signals, and an information transmission unit for wirelessly transmitting the information data output from the central processor unit; and an information display module, which includes an information receiving unit for receiving the information data wirelessly transmitted from the information transmission unit of the signal receiving module, a GPS engine for detecting GPS data transmitted from a satellite, a memory unit for storing coordinates data used to indicate the location of a moving vehicle, an audible indication unit for audibly outputting the data received through the information receiving unit or detected through the GPS engine, a visual display unit for visually displaying the data received through the information receiving unit or detected through the GPS engine, and a central processor unit for controlling operations of the visual display unit and the audible indication unit according to the data received through the information unit or detected through the GPS engine.

The information display module may further includes a serial communication unit for communicating with a user's computer, and a switching unit for temporarily restricting the operation of the GPS engine under control of the central processor unit when data is downloaded through the serial communication unit.

The information display module may further include a back-up battery for supplying power to the internal memory of the GPS engine.

The information display module may be operated by power supplied from a portable battery or a solar cell battery.

The signal processing unit of the signal receiving module may include a first local oscillator for producing oscillations of a first frequency, a sweep voltage generator for driving the first local oscillator, a first mixer for mixing the first frequency of the oscillations of the first local oscillator with the frequency of the signal received through the horn antenna, and outputting a difference signal, a first amplifier for amplifying the difference signal that is the output signal of the first mixer, second and third local oscillators for alternately producing the oscillations of second and third frequencies, a second mixer for mixing the signal of the second and third local oscillators with the output signal of the first amplifier, and outputting a difference signal, a second amplifier for amplifying the difference signal that is the output signal of the second mixer, a filter for selectively passing the output signal of the second amplifier through, a demodulator for detecting the signal passed through the filter, and an analog to digital converter for converting the detected signal into a digital signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
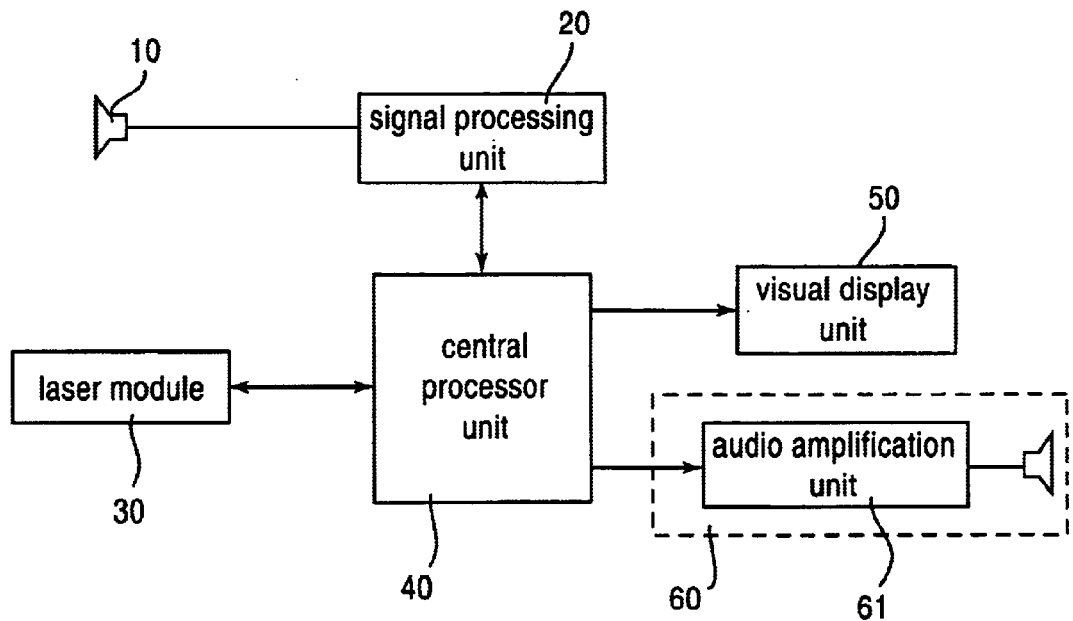
FIG. 1 is a block diagram schematically showing the construction of a conventional combined radar and laser detector.
Figure 2:
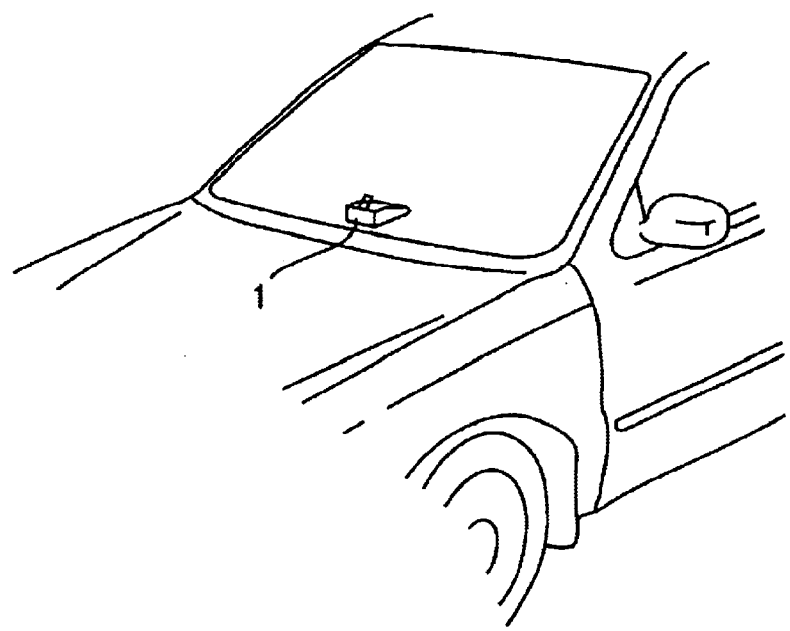
FIG. 2 is a view showing the installation of the conventional combined radar and laser detector.

Reference now should be made to the drawings, in which the same reference numerals are used throughout the different drawings to designate the same or similar components.

Figure 3:
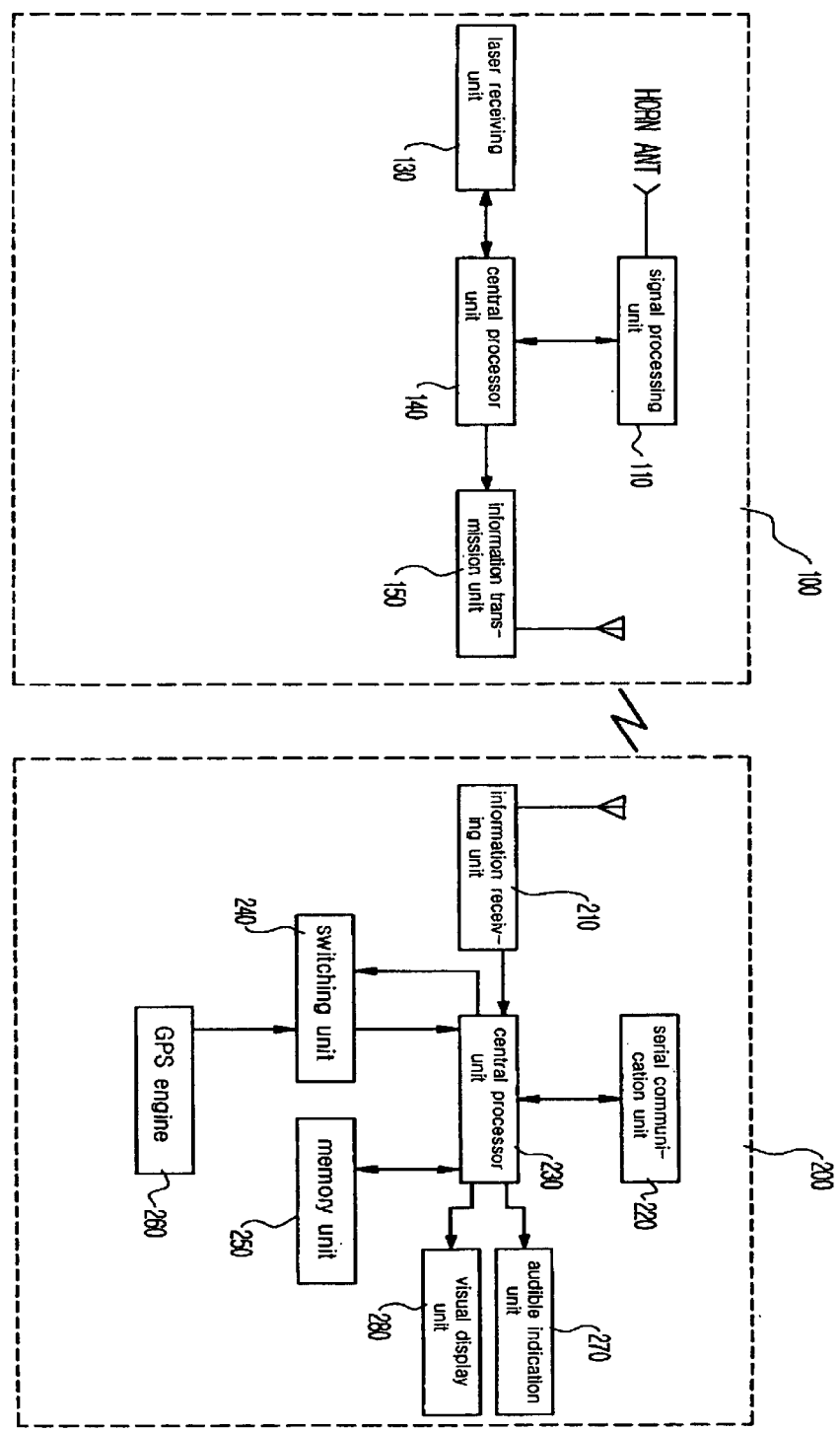
FIG. 3 is a block diagram schematically showing the construction of a combined radar and laser detector according to the present invention.

FIG. 3 is a block diagram schematically showing the construction of a combined radar and laser detector having a GPS receiver according to the present invention. The combined radar and laser detector of the present invention includes a signal receiving module 100 for detecting various kinds of signals that enable a driver to drive safely, and an information display module 200 for detecting GPS data related to the location and speed of a moving vehicle and informing the driver of the GPS data and the data detected through the signal receiving module 100. The signal receiving module 100 placed outside and on front of the vehicle and the information display module 200 placed inside the vehicle are constructed to wirelessly communicate with each other using an ultra high frequency of 300 to 400 MHz.

The signal receiving module 100 includes a signal processing unit 110 for detecting a signal received through a horn antenna, a laser receiving unit 130 for receiving a laser signal, a central processor unit 140 for controlling the detection of the signals received through the signal processing unit 110 and the laser receiving unit 130, analyzing the detected signals and outputting the information data of the detected signals, and an information transmission unit 150 for wirelessly transmitting the information data output from the central processor unit 140 to the information display module 200.

Meanwhile, the information display module 200 includes an information receiving unit 210 for receiving the information data wirelessly transmitted from the information transmission unit 150 of the signal receiving module 100, a GPS engine 260 for detecting GPS data transmitted from a satellite, a memory unit 250 for storing coordinates data used to indicate the location of the moving vehicle, an audible indication unit 270 for audibly outputting the data received through the information receiving unit 210 or detected through the GPS engine 260, a visual display unit 280 for visually displaying the data received through the information receiving unit 210 or detected through the GPS engine 260, and a central processor unit 230 for controlling the operations of the visual display unit 280 and the audible indication unit 270 according to the data received through the information receiving unit 210 or detected through the GPS engine 260.

The information display module 200 further includes a serial communication unit 220 for communicating with a user's computer, and a switching unit 240 for temporarily restricting the operation of the GPS engine 260 according to the control of the central processor unit 230 to prevent a collision that can be incurred at the time of downloading data through the serial communication unit 220.

Figure 4:
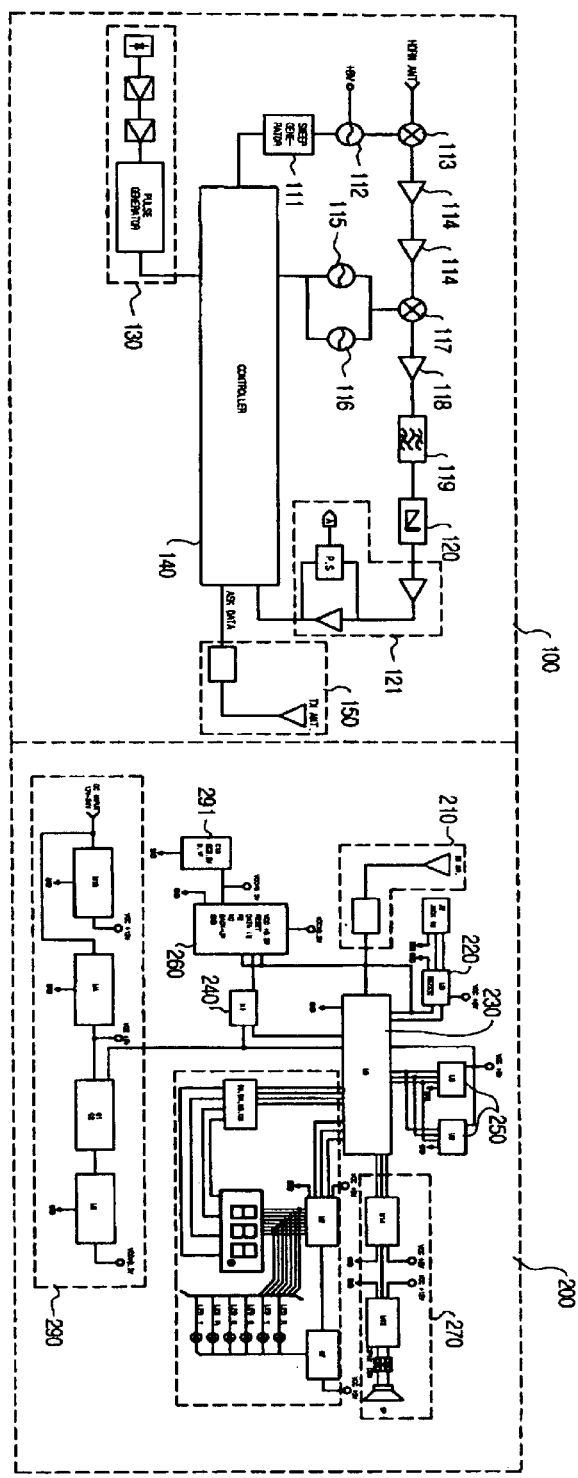
FIG. 4 is a block diagram showing the construction of the combined radar and laser detector of to the present invention in detail.

FIG. 4 is a block diagram showing the detailed construction of the combined radar and laser detector. The signal processing unit 110 of the signal receiving module 100 includes a first local oscillator 112 for producing oscillations of 10 GHz, a sweep voltage generator 111 for operating the first local oscillator 112, a first mixer 113 for mixing the frequency of the oscillations generated from the first local oscillator 112 with a frequency of 10 to 40 GHz received through the horn antenna, and outputting a frequency of 1 to 2 GHz that is a difference signal, and a first amplifier 114 for amplifying the difference signal that is the output signal of the first mixer 113.

The signal processing unit 110 of the signal receiving module 100 further includes second and third local oscillators 115 and 116 for alternately producing oscillations of different frequencies, a second mixer 117 for mixing the oscillation signal of the second and third local oscillators 115 and 116 with the output signal of the first amplifier 114, and outputting a frequency of 10.7 MHz that is a difference signal, a second amplifier 118 for amplifying the difference signal that is the output signal of the second mixer 117, a filter 119 for selectively passing the output signal of the second amplifier 118 therethrough, a demodulator 120 for detecting the signal passed through the filter 119, and an Analog to Digital (AD) converter 121 for converting the detected signal into a digital signal.

Additionally, the central processor unit 140 controls the operations of the first to third local oscillators 112, 115, and 116 to receive various kinds of signals through the horn antenna, analyzes the signals detected through the signal processing unit 110 and the laser receiving unit 130, abstracts information data from the detected signals, and wirelessly transmits the information data to the information display module 200 through the information transmission unit 150 using a frequency of 390 MHz. The signal receiving module 100 is located outside and on front of a vehicle and is constructed to be operated by the battery of the vehicle.

Meanwhile, as shown in FIG. 4, the information display module 200 includes the information receiving unit 210 for receiving the information data wirelessly transmitted from the information transmission unit 150 of the signal receiving module 100, the GPS engine 260 for detecting GPS data included in a signal of 1575.42 MHz transmitted from the satellite, and the memory unit 250 for storing the coordinates data used to indicate the location of the moving vehicle.

Furthermore, the central processor unit 230 controls the operations of the visual display unit 280 and the audible indication unit 270 according to data received through the information receiving unit 210 or detected through the GPS engine 260, and thus provides the traffic information to a driver.

The visual display unit 280 is constructed in a dynamic fashion in the embodiment of the present invention. That is, the visual display unit 280 is constructed in such a way that switching devices Q3 to Q7 to be switched according to the control signal of the central processor unit 230 are switched every 5 ms, so that the traffic information is represented by the flickering of Light Emitting Diodes (LEDs) or the operation of seven-segment displays. However, the present invention is not limited to this construction.

The information display module 200 further includes the serial communication unit 220 for communicating with the user's computer and downloading data therefrom. To prevent a collision incurred at the time of downloading data through the serial communication unit 220, the central processor unit 230 controls the switching unit 240 to cut off the power and data lines of the GPS engine 260. Accordingly, the operation of the GPS engine 260 is temporarily restricted. In this case, to prevent the data stored in the internal memory of the GPS engine 260 from being lost, back-up power is supplied by a back-up battery 291.

The information display module 200 is composed of components whose power consumption is considerably smaller than that of the signal receiving module 100, so that the information display module 200 can be operated by a portable battery or a solar cell battery, so the size of a battery can be minimized, and thus the restriction of the mounting space can be solved.

Reference numeral 290 designates a power unit to supply power used for operating the information display module 200. The power unit 290 converts an applied input voltage of 8 to 30 V into voltages of 12 V, 5 V and 3.3 V, and outputs the converted voltages.

A method of operating the combined radar and laser detector according to the present invention is described in detail below.

When a frequency signal of 10 to 40 GHz including various kinds of traffic information is received from the horn antenna, the first local oscillator 112 of the signal processing unit 110 produces oscillations of 10 GHz according to the control of the central processor unit 140. The frequency of the oscillations generated from the first local oscillator 112 is mixed with a frequency of 10 to 40 GHz received through the horn antenna by the first mixer 113, a frequency of 1 to 2 GHz that is a difference signal is output, and the difference signal is amplified by the first amplifier 114.

Additionally, the difference signal amplified by the first amplifier 114 is mixed with one of the oscillation signals generated from the second and third local oscillators 115 and 116, which alternately produce oscillations of different frequencies, by the second mixer 117. A frequency of 10.7 MHz that is the difference signal output from the second mixer 117 is amplified by the second amplifier 118, filtered by the filter 119, detected by the demodulator 120 while passing therethrough, converted into a digital signal by the AD converter 121, and input to the central processor unit 140.

Meanwhile, the central processor unit 140 controls the operations of the first to third local oscillators 112, 115, and 116 to receive the various kinds of signals through the horn antenna, analyzes the signals detected through the signal processing unit 110 and the general laser receiving unit 130, extracts information data from the detected signals, and wirelessly transmits the information data to the information display module 200 through the information transmission unit 150 using a frequency of 390 MHz.

The information data wirelessly transmitted is received by the information receiving unit 210 of the information display module 200 placed inside a vehicle, and applied to the central processor unit 230. Furthermore, the GPS engine 260 detects GPS data, which is related to the location and speed of a moving vehicle and included in a frequency of 1575.42 MHz, and applies the GPS data to the central processor unit 230.

According to the data received through the information receiving unit 210 or the GPS data detected through the GPS engine 260, the central processor unit 230 drives the visual display unit 280 to visually display the received traffic information, or drives the audible indication unit 270 to audibly inform the driver of the received traffic information.

That is, the central processor unit 230 switches the switching devices Q3 to Q7 to display the traffic information by flickering LEDs or using seven-segment displays, and operates an audio Integrated Circuit (IC) constituting a part of the audible indication unit 270 to audibly inform the driver of the traffic information.

Additionally, data can be downloaded from the user's computer through the serial communication unit 220. In this case, the central processor unit 230 outputs a control signal to switch the switching unit 240 so as to cut off the power and data lines of the GPS engine 260. Accordingly, the operation of the GPS engine 260 is temporarily stopped, so that a collision incurred at the time of downloading the data can be prevented.

When the power line of the GPS engine 260 is cut off, data stored in the internal memory of the GPS engine 260 may be lost. To prevent the data from being lost, the back-up battery 291 supplies back-up power to the GPS engine 260. As a result, time to prepare the re-operation of the GPS engine 260 can be reduced, so that an operation speed can be increased.

The combined radar and laser detector of the present invention is constructed in such a way that a signal receiving module for receiving various kinds of signals that enable a driver to drive safely and an information display module for informing the driver of the signals are separated from each other, the signal receiving module and the information display module are constructed to communicate with each other using wireless communication, and the information display module is integrated with the GPS receiver detecting GPS data related to the location and speed of a moving vehicle, so that the combined radar and laser detector can not only provide accurate traffic information to the driver but also allow the installation thereof to be easy, the miniaturization thereof to be achieved, and the power consumption thereof to be minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A combined radar and laser detector having a Global Positioning System (GPS) receiver and using wireless communication, comprising:

a signal receiving module, which comprises a signal processing unit for detecting a first signal received through a horn antenna, a laser receiving unit for receiving a laser signal, a central processor unit for controlling detection of the signals received through the signal processing unit and the laser receiving unit, analyzing the detected signals, and outputting information data of the first detected signals, and an information transmission unit for wirelessly transmitting the information data output from the central processor unit; and an information display module, which comprises an information receiving unit for receiving the information data wirelessly transmitted from the information transmission unit of the signal receiving module, a GPS engine for detecting GPS data transmitted from a satellite, a memory unit for storing coordinates data used to indicate a location of a moving vehicle, an audible indication unit for audibly outputting the data received through the information receiving unit or detected through the GPS engine, a visual display unit for visually displaying the data received through the information receiving unit or detected through the GPS engine, and a second central processor unit for controlling operations of the visual display unit and the audible indication unit according to the data received through the information unit or detected through the GPS engine.

2. The combined radar and laser detector as set forth in claim 1, wherein the information display module further comprises a serial communication unit for communicating with a user's computer, and a switching unit for temporarily restricting an operation of the GPS engine under control of the second central processor unit when data is downloaded through the serial communication unit.

3. The combined radar and laser detector as set forth in claim 1, wherein the information display module further comprises a back-up battery for supplying power to an internal memory of the GPS engine.

4. The combined radar and laser detector as set forth in claim 1, wherein the information display module is operated by power supplied from a portable battery or a solar cell battery.

5. The combined radar and laser detector as set forth in claim 1, wherein the signal processing unit of the signal receiving module comprises:

a first local oscillator for producing oscillations of a first frequency, a sweep voltage generator for driving the first local oscillator, a first mixer for mixing the first frequency of the oscillations of the first local oscillator with the frequency of the signal received through the horn antenna, and outputting a difference signal, a first amplifier for amplifying the difference signal that is an output signal of the first mixer, second and third local oscillators for alternately producing oscillations of second and third frequencies, a second mixer for mixing the signal of the second and third local oscillators with the output signal of the first amplifier, and outputting a difference signal, a second amplifier for amplifying the difference signal that is an output signal of the second mixer, a filter for selectively passing the output signal of the second amplifier through, a demodulator for detecting the signal passed through the filter, and an analog to digital converter for converting the detected signal into a digital signal.

* * * * *